May 19, 1953 — C. A. BOYCE — 2,638,841

GRILL

Filed Aug. 19, 1952 — 3 Sheets-Sheet 1

INVENTOR.
Clifford A. Boyce,
BY
His Attorneys.

May 19, 1953 C. A. BOYCE 2,638,841
GRILL
Filed Aug. 19, 1952 3 Sheets-Sheet 2

INVENTOR.
Clifford A. Boyce,
BY
His Attorneys.

May 19, 1953  C. A. BOYCE  2,638,841
GRILL
Filed Aug. 19, 1952  3 Sheets-Sheet 3
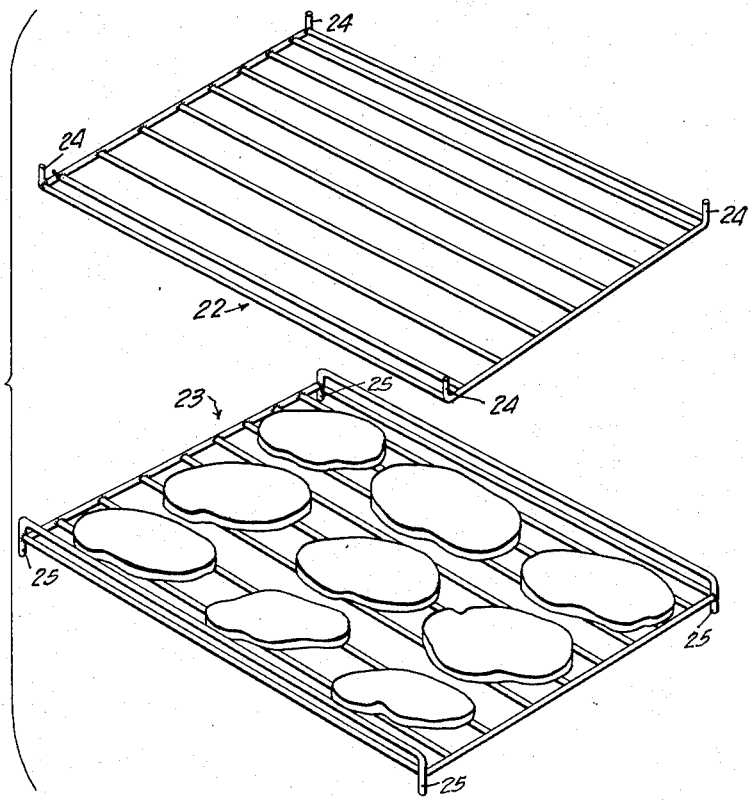
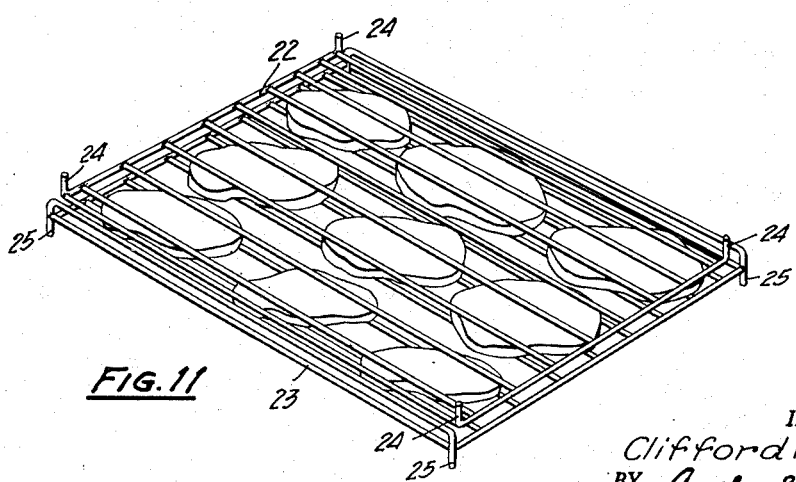
INVENTOR.
Clifford A. Boyce,
BY
His Attorneys.

Patented May 19, 1953

2,638,841

UNITED STATES PATENT OFFICE 2,638,841

GRILL

Clifford A. Boyce, Burlington, Vt.

Application August 19, 1952, Serial No. 305,121

17 Claims. (Cl. 99—397)

My invention relates to cooking devices and particularly to grills for roasting or broiling various articles of food over an open fire and which is particularly adapted for barbecuing whole animals or large pieces of meat, turkeys, chickens and the like.

One of the objects of my invention is to provide an outdoor grill or roasting device which is adapted to cook either small, comparatively flat pieces of meat, such as chops, steaks or the like, or to barbecue whole animals or birds such, for example, as small pigs and turkeys. Another object is to provide an outdoor cooking device which can be readily transported from place to place and in which the grill which carries the article or articles to be roasted is adjustable so that a wide variety of articles, insofar as their shape and size is concerned, may be roasted. Another object is to provide a device of this character in which the grill element is readily detachable from the fuel supporting means to facilitate cleaning and transportation thereof, and to allow it to be used over substantially any fire.

I accomplish these objects by means of the novel elements and the combinations and arrangements thereof described below and illustrated in the accompanying drawings in which—

Fig. 1 is a side elevation view of the rotating element of the grill in collapsed or closed condition with certain portions broken away and also showing the supports therefor, and the motor;

Fig. 2 may be considered a top view of the rotating grill parts in the relative positions shown in Fig. 1, but to a somewhat larger scale, and also showing, in dotted outline, how a plurality of the comparatively flat pieces of meat, such as steaks, hamburgers or the like, are held therein while they are being roasted;

Fig. 10 is an exploded, perspective view illustrating how a plurality of steaks and the like may be initially placed on a lower element of the grill and secured thereon by placing the upper element of the grill thereover, as shown in Fig. 11; and Fig. 11 is a perspective view showing a plurality of steaks or the like held between two of the flat grill elements which may be secured to the rotating elements, as shown in Figs. 1, 2, 3, 5 and 9.

Figure 1:
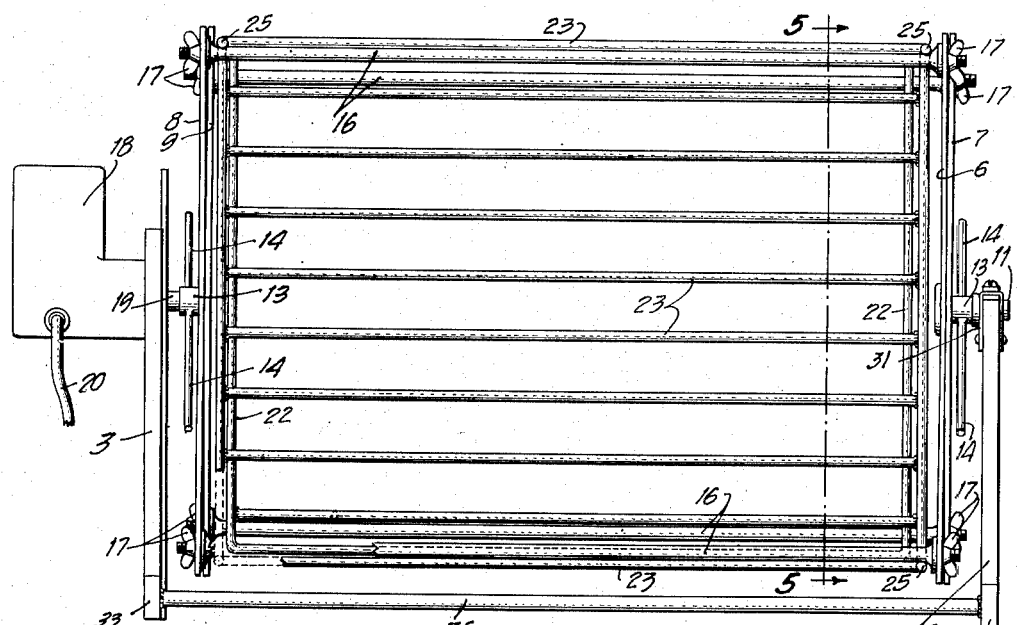
Figure 2:
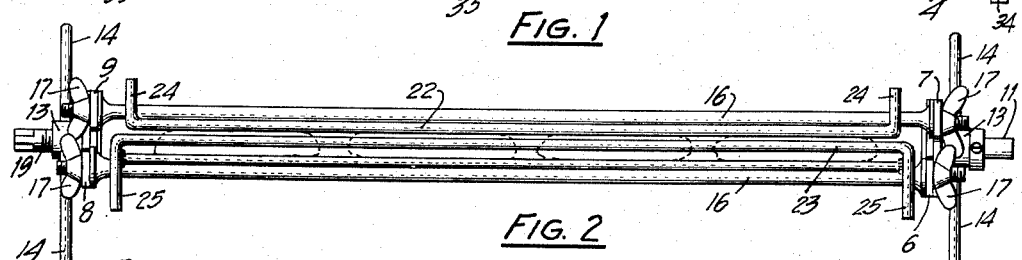
Figure 3:
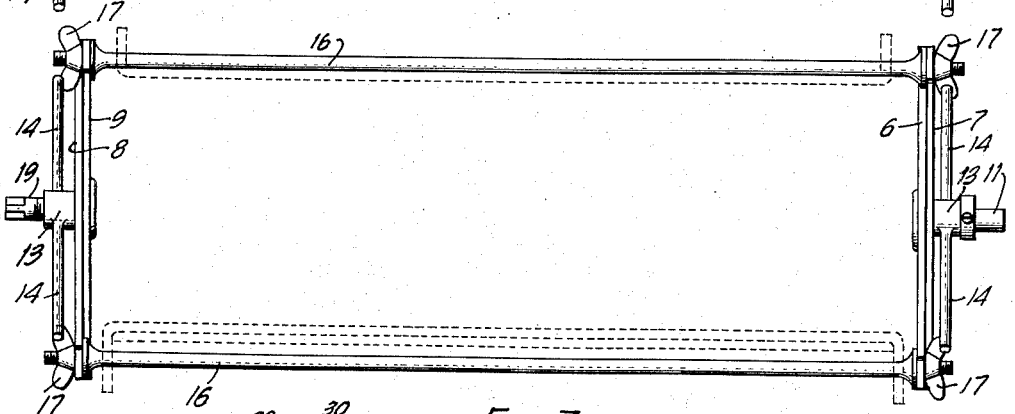
Fig. 3 is a plan view showing certain of the rotating elements of the grill in open position.
Figure 4:
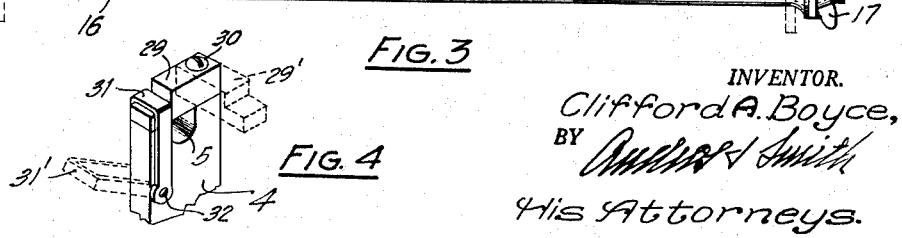
Fig. 4 is a fragmentary, perspective view of one of the upstanding supports for the grill showing a bearing in which one end of the grill is rotatably supported.
Figure 9:
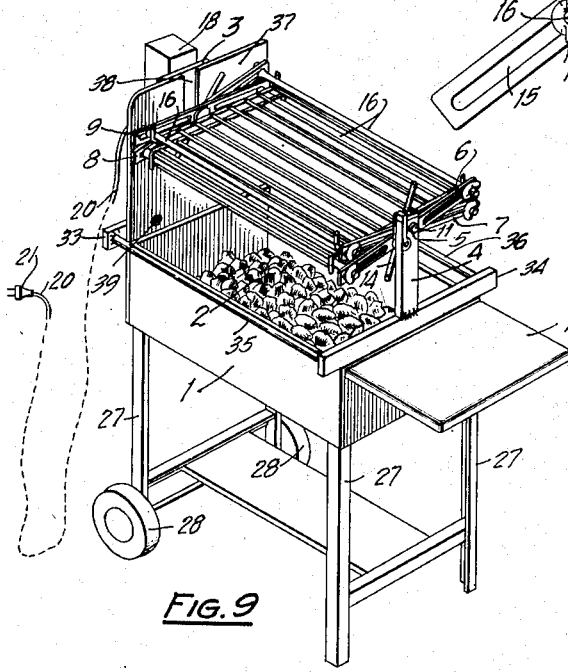
Fig. 9 is a perspective view of the entire device.
Figure 8:
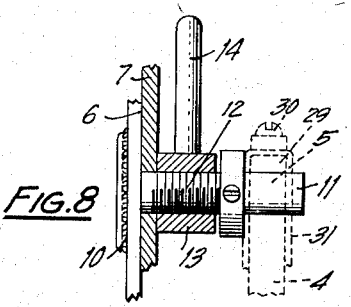
Fig. 8 is an enlarged, fragmentary detail, partially in section, illustrating the means for clamping the grill carriers together to rotate as a unit.

Referring to Fig. 9, my device comprises means 1 for supporting a bed of fuel 2, and having a shelf 1' at one end thereof. 3 and 4 are upstanding supports having aligned bearings therein, one of which is shown at 5, and also in Figs. 4 and 8. A pair of grill carriers 6 and 7 is rotatably supported in the bearing 5 and a pair of similar grill carriers 8 and 9 is rotatably supported in a bearing (not shown) in the support 3. Welded to the carrier 6 (see Fig. 8) as shown at 10, is a stub shaft 11 which is supported in the bearing 5. A portion of this stub shaft adjacent the carrier 6, and which is of slightly larger diameter than the bearing portions, is threaded, as shown at 12, and cooperates with a clamping nut 13 which may be turned by the handles 14. The grill carrier 7 is mounted to rotate freely on the stub shaft 11 between the nut 13 and the carrier 6. Thus, by loosening the clamp nut 13, the grill carriers 6 and 7 may be freely rotated independently of each other so that they may be positioned in various angular relationships and clamped by the nut 13 so that they will rotate together as a unit about the axis of the bearings in the supports 3 and 4. The grill carriers 8 and 9 adjacent the support 3 are similar to the carriers 6 and 7 and are provided with a similar clamping nut 13. The grill carriers 6, 7, 8 and 9 are provided with longitudinally-extending slots 15 therein in which rods or bars 16 extending across and above the fuel support may be secured at various distances from the axis of the grill by means of the wing nuts 17; the rods 16 being threaded at their extremities which extend through the slots 15 and cooperate with said wing nuts.

In order to rotate the grill, an electric motor 18 is connected, through suitable speed reducing gears (not shown), to the stub shaft 19 (see Figs. 1, 2 and 3), and may be electrically connected to any outlet by means of the cord 20 and the plug 21 (see Fig. 9).

Figures 5, 6:
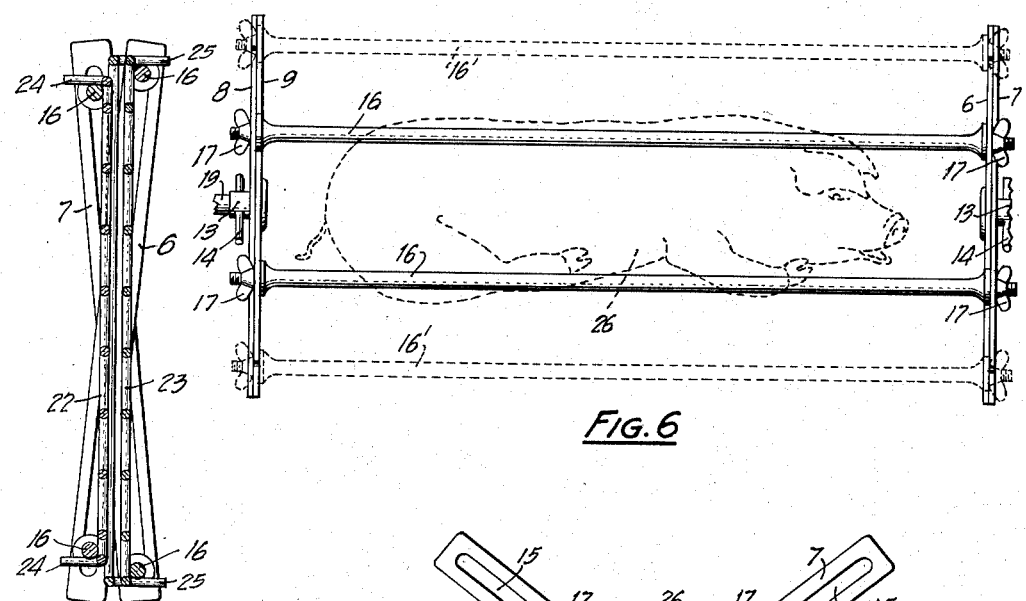
Fig. 5 is a section of Fig. 1 in the plane 5—5.
Fig. 6 is a side elevation view showing how a pig may be secured in the grill.
Figure 7:
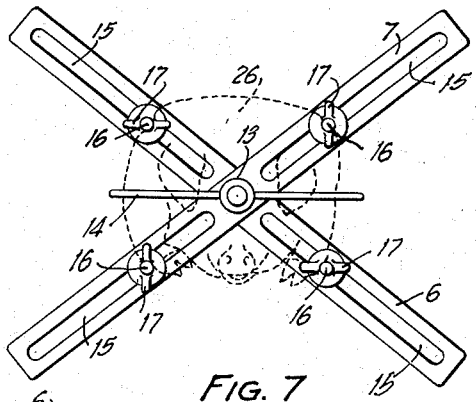
Fig. 7 is a right hand end view of Fig. 6 but drawn to a somewhat larger scale.

In order to hold flat pieces of meat, such as chops, steaks, hamburgers, etc., in the grill during the broiling thereof, I provide two separate grills 22 and 23 which are perhaps best shown in Figs. 10 and 11. The grill 22 is provided at the corners with upstanding portions 24, and the grill 23 is provided with depending portions 25 at the corners thereof, by means of which said grills may be secured to the grill carriers 6, 7, 8 and 9 by moving the bars or rods 16 into contact therewith, clamping the bars or rods by means of the wing nuts 17, and then clamping the carriers together by means of the nuts 13 and handles 14.

Where a pig 26, for example, is to be barbecued, it may be secured between the bars 16, as shown in Figs. 6 and 7. Thus, spits, with the attendant difficulties of thrusting them through the meat to be cooked, have been eliminated.

The fuel bed and the rotating grill are preferably supported at a substantial distance above the ground by means of legs 27; and ground wheels 28 are preferably provided at least at one end of the device to facilitate the movement of the device from place to place.

Referring now more particularly to Fig. 4, in order to make the entire rotating grill readily removable from the supports 3 and 4, the bearing 5 in support 4 is closed at the top by a block 29 which is pivotally secured on one side of the bearing by means of the screw 30 so that it may be swung or displaced from the position shown at 29 to that shown in dotted outline at 29'. In order to hold the block 29 in place when the stud shaft 11 of the grill is positioned therein, I provide the U-shaped strap 31 which is pivoted to the support 4 at 32 so that it may be swung down into the position shown in dotted outline at 31' to allow the block 29 to be turned to the position 29' and the stub shaft lifted from the bearing.

In order to make the rotating grill and its supports 3 and 4 removable as a unit from the fuel supporting means or fire box 1, so that it may be set up over any fire or fuel bed, the supports 3 and 4 are welded to the horizontal base members 33 and 34, respectively, and the members 33 and 34 are connected together by the rods 35 and 36 which are welded thereto; thus forming a rigid frame in which the grill is rotatably mounted.

As illustrated in Fig. 9, the plate 37 is fixed to the end of the firebox and is provided with a slot 38 therein through which the stub axle 19 can be dropped. The member 34 is supported on one end of the firebox, and the whole unit is detachably secured to the firebox by screws, such as shown at 39, which fasten the member 3 to the plate 37.

I claim:

1. A grill comprising means for supporting a bed of fuel; spaced supports extending above said fuel supporting means at opposite ends thereof and having aligned bearings therein; a first pair of grill carriers rotatably mounted in said bearings, one adjacent each support; a second pair of grill carriers, one closely adjacent each of said first carriers; bearings coaxial with the bearings of said first carriers in which said second carriers are mounted to rotate independently of said first carriers; means for clamping said first and second carriers to rotate together; a first pair of bars extending over said fuel supporting means and connecting said first pair of carriers together; a second pair of bars extending over said fuel supporting means and connecting said second pair of carriers together; a pair of grills secured together in closely spaced relation between said pairs of bars, whereby, food to be grilled may be held between said grills; and means for rotating said grills.

2. The structure set forth in claim 1 in which the means for rotating said grills is an electric motor.

3. The structure set forth in claim 1 in which at least one of said aligned bearings comprises a readily displaceable cap whereby said bars, grills and grill carriers may be removed from said aligned bearings as a unit when said cap is displaced.

4. A grill comprising means for supporting a bed of fuel; spaced supports extending above said fuel supporting means at opposite ends thereof and having aligned bearings therein; a first pair of grill carriers rotatably mounted in said bearings, one adjacent each support; a second pair of grill carriers, one closely adjacent each of said first carriers; bearings coaxial with the bearings of said first carriers in which said second carriers are mounted to rotate independently of said first carriers; means for clamping said first and second carriers to rotate together; a first pair of bars extending over said fuel supporting means; means separately securing each of said first pair of bars to one of said pairs of grill carriers in adjustably spaced relation to each other; a second pair of bars extending over said fuel supporting means; means separately securing each of said second pair of bars to the other of said grill carriers in adjustably spaced relation to each other; whereby, a large object to be grilled may be clamped between said pairs of bars in a position over said fuel supporting means; and means for rotating said grill carriers.

5. The structure set forth in claim 4 in which the means for rotating said grill carriers is an electric motor.

6. The structure set forth in claim 4 in which at least one of said aligned bearings comprises a readily displaceable cap whereby said bars, grills and grill carriers may be removed from said aligned bearings as a unit when said cap is displaced.

7. A grill comprising a pair of rectangular frames, having elongated side members comprising metal rods having threaded ends, and shorter end members having slots therein through which said rods extend and are secured to said end members by nuts cooperating with the threaded ends of said bars; means pivotally connecting the end members of said frames together at the centers thereof in crossed relation, whereby they may be swung from positions at right angles to each other into an approximately flat unit; means for clamping said frames together in any positions into which they may be swung; and a shaft substantially coaxial with said pivotal connecting means extending outwardly from each end of said grill for rotatably mounting said grill in suitable bearings.

8. A device adapted to roast a comparatively large object, such as a small pig, and comprising means for supporting a bed of fuel; spaced grill supports on opposite sides of said fuel supporting means having aligned bearings therein; a pair of relatively rotatable grill carriers rotatably mounted in said bearings; a grill comprising a plurality of rods extending across said fuel supporting means in vertically-spaced relation thereto; means for securing said rods to said carriers at selected distances from the axis of said bearings; and means for clamping said carriers together to rotate as a unit about the axis of said bearings when disposed in selected angular relation to each other; whereby, said rods and said carriers may be adjusted to secure said object between said rods.

9. The structure set forth in claim 8 together with means for rotating said grill in said bearings.

10. The structure set forth in claim 8 together with an electric motor for rotating said grill.

11. A grill comprising means for supporting a bed of fuel; spaced supports extending above said fuel supporting means at opposite ends thereof and having aligned bearings therein; a stub shaft rotatably mounted in each of said bearings; a pair of relatively rotatable, radially-extending elements adjacent each of said supports having elongated radially-extending slots therein, mounted to rotate about the axis of each of said shafts; means for clamping the elements of each pair thereof together in selected angular relation to each other to rotate as a unit about the axis of said bearings; and four approximately parallel-disposed rods above and extending across said fuel supporting means provided with threaded ends extending through the slots in said elements, and nuts cooperating therewith and connecting said pairs of elements together; whereby the radial spacing of said rods may be adjusted and the angular relation of said elements may be adjusted to secure articles of various size and shape between said rods over a bed of fuel on said fuel supporting means; and means for rotating said rod and element assembly about the axis of said bearings.

12. The structure set forth in claim 11 in which the means for rotating said grills is an electric motor.

13. A grill comprising a pair of rectangular frames, having elongated side members comprising metal rods having threaded ends, and shorter end members having slots therein through which said rods extend and are secured to said end members by nuts cooperating with the threaded ends of said bars; means pivotally connecting the end members of said frames together at the centers thereof in crossed relation, whereby they may be swung from positions at right angles to each other into an approximately flat unit; means for clamping said frames together in any positions into which they may be swung; a shaft substantially coaxial with said pivotal connecting means extending outwardly from each end of said grill; a pair of spaced, upstanding supports provided with aligned bearings in which said shafts are rotatably mounted; and spaced bars rigidly connecting said supports together; whereby said grill may be positioned over a bed of fuel disposed between said supports.

14. The structure set forth in claim 13 together with an electric motor operatively connected to one of said shafts for rotating said grill.

15. A device of the character described comprising a rigid frame having two, spaced, upstanding grill supports thereon provided with aligned bearings therein; a grill comprising a pair of rectangular frames; means pivotally connecting said rectangular frames together at the centers of opposite ends thereof to rotate independently of each other between a position in which they are disposed at right angles to each other and a position in which they form an approximately flat unit; a shaft coaxial with said pivotal connecting means projecting from each end of said rectangular frames and rotatably mounted in said bearings; means for clamping said rectangular frames together to rotate as a unit in said bearings; and means for rotating said unit in said bearings; whereby, meat to be grilled may be clamped between said rectangular frames.

16. The structure set forth in claim 15 together with an electric motor for rotating said rectangular frames, and means securing said motor to one of said upstanding supports.

17. The structure set forth in claim 15 in which the sides of said rectangular frames are provided with means adjustably connecting them to the pivotally connected ends thereof.

CLIFFORD A. BOYCE.

References Cited in the file of this patent

UNITED STATES PATENTS

| Number | Name | Date |
| --- | --- | --- |
| 504,256 | Strong | Aug. 29, 1893 |
| 559,720 | Lacroix | May 5, 1896 |
| 1,359,749 | Schey | Nov. 23, 1920 |
| 2,144,918 | Garvis | Jan. 24, 1939 |